United States Patent
Trabold et al.

(10) Patent No.: US 8,277,986 B2
(45) Date of Patent: Oct. 2, 2012

(54) BIPOLAR PLATE WITH MICROGROOVES FOR IMPROVED WATER TRANSPORT

(75) Inventors: Thomas A. Trabold, Pittsford, NY (US); Gayatri Vyas Dadheech, Rochester Hills, MI (US); Mahmoud H. Abd Elhamid, Grosse Pointe Woods, MI (US); Yan Zhang, Victor, NY (US); Keith E. Newman, Pittsford, NY (US); Jeffrey A. Rock, Fairport, NY (US); Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1325 days.

(21) Appl. No.: 11/772,406

(22) Filed: Jul. 2, 2007

(65) Prior Publication Data

US 2009/0011310 A1    Jan. 8, 2009

(51) Int. Cl.
*H01M 8/02*        (2006.01)
(52) U.S. Cl. ......... 429/414; 429/457; 429/518; 429/535
(58) Field of Classification Search ................. 429/414, 429/457, 518, 535
See application file for complete search history.

(56) References Cited

U.S. PATENT DOCUMENTS

| | | | |
|---|---|---|---|
| 6,329,094 B1 * | 12/2001 | Yasuo et al. | 429/513 |
| 6,372,376 B1 | 4/2002 | Fronk et al. | |
| 6,649,297 B1 * | 11/2003 | Marchand et al. | 429/513 |
| 6,866,958 B2 | 3/2005 | Vyas et al. | |
| 7,087,337 B2 | 8/2006 | Trabold et al. | |
| 2003/0054221 A1 * | 3/2003 | Saito et al. | 429/34 |
| 2006/0040148 A1 | 2/2006 | Blunk et al. | |
| 2006/0141328 A1 * | 6/2006 | Johnston et al. | 429/38 |
| 2006/0194095 A1 * | 8/2006 | Vyas et al. | 429/38 |
| 2006/0216571 A1 | 9/2006 | Vyas et al. | |
| 2009/0023029 A1 * | 1/2009 | Matsumoto et al. | 429/30 |

FOREIGN PATENT DOCUMENTS

| | | |
|---|---|---|
| CN | 1550050 | 11/2004 |
| CN | 1893156 | 1/2007 |
| CN | 1918725 | 2/2007 |
| JP | 08138692 A * | 5/1996 |
| WO | WO 9852242 A1 * | 11/1998 |
| WO | WO 2006121157 A1 * | 11/2006 |
| WO | 2007/021679 | 2/2007 |

OTHER PUBLICATIONS

Raymond M. Karam, "A New 3D, Direct-Write, Sub-Micron Microfabrication Process that Achieves True Optical, Mechatronic and Packaging Integration on Glass-Ceramic Substrates", 2003.
Jingtao Zhu et al, "Evolution of Silicon Surface Microstructures by Picosecond and Femtosecond Laser Irradiations", Applied Surface Science 245 (2005) 102-108.

* cited by examiner

*Primary Examiner* — Gregg Cantelmo
(74) *Attorney, Agent, or Firm* — BrooksGroup

(57) ABSTRACT

One embodiment of the invention comprises a fuel cell bipolar plate comprising a substrate comprising a first face, a reactant gas flow field defined in the first face, the reactant gas flow field comprising a plurality of lands and channels, and a plurality of microgrooves formed in the first face.

45 Claims, 5 Drawing Sheets

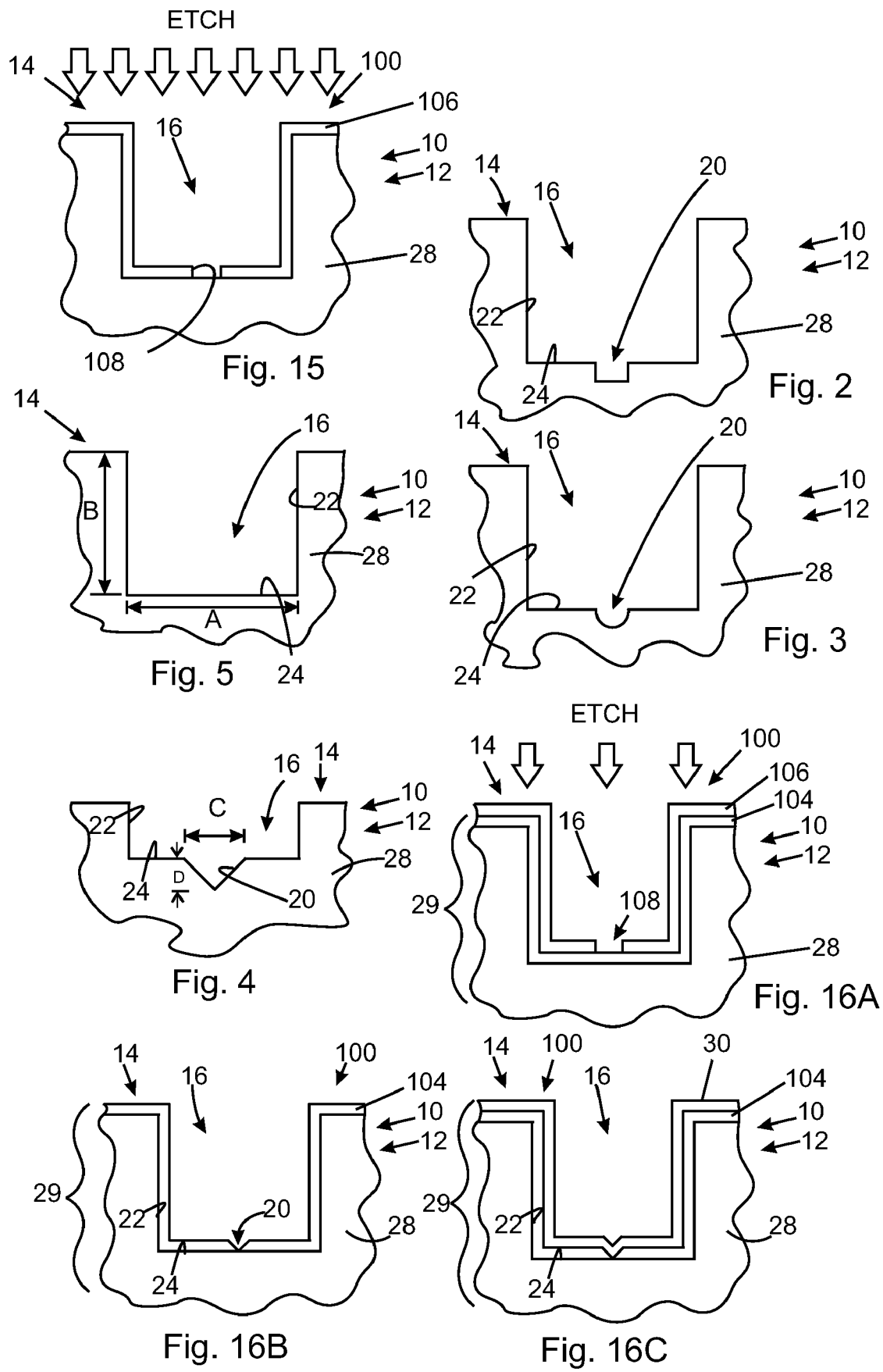

BIPOLAR PLATE WITH MICROGROOVES FOR IMPROVED WATER TRANSPORT

TECHNICAL FIELD

The field to which the disclosure generally relates includes bipolar plates of a fuel cell, and more particularly, bipolar plates having microgrooves formed therein.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte between the anode and the cathode. The anode receives hydrogen-rich gas or pure hydrogen and the cathode receives oxygen or air. The hydrogen gas is dissociated in the anode to generate free protons and electrons. The protons pass through the electrolyte to the cathode, where the protons react with the oxygen and the electrons in the cathode to generate water. The electrons from the anode are unable to pass through the electrolyte. Therefore, the electrons are directed through a load to perform work before they are sent to the cathode. The work may be used, for example, to operate a vehicle.

Several fuel cells are typically combined in a fuel cell stack to generate the desired power. The fuel cell stack includes a series of bipolar plates. The fuel cell bipolar plates include an anode side and a cathode side for adjacent fuel cells in the stack. Anode gas flow channels are provided on the anode side of the bipolar plates and cathode gas flow channels are provided on the cathode side of the bipolar plates. The fuel cell bipolar plates may also include flow channels for a cooling fluid.

The fuel cell bipolar plates are typically made of a conductive material, such as a carbon-composite or metal, so that they conduct the electricity generated by the fuel cells from one cell to the next cell and out of the stack. The fuel cell bipolar plates may be machined from relatively thin metal substrates or may be stamped to provide reactant gas flow fields and coolant fluid flow fields.

As is well understood in the art, a fuel cell needs to have a certain relative humidity. During operation of the fuel cell, moisture may enter the anode and cathode flow channels. At low cell power demands, typically below 0.2 A/cm$^2$, water accumulates within the flow channels because the flow rate of the reactant gas is too low to force the water out of the channels. As the water accumulates, it forms droplets that continue to expand because of the hydrophobic nature of the plate material. The contact angle of the water droplets is generally about 90° in that the droplets form in the flow channels substantially perpendicular to the flow direction of the reactant gas. As the size of the droplets increases, the flow channel is closed off, and the reactant gas is diverted to other flow channels because the channels flow in parallel between common inlet and outlet manifolds. Because the reactant gas may not flow through a channel that is blocked with water, the reactant gas cannot force the water out of the channel. As more and more flow channels are blocked by water, the electricity produced by the fuel cell decreases. Because the fuel cells are electrically coupled in series, if one of the fuel cells stops performing, the entire fuel cell stack may stop performing. Further, water accumulation inside the channels on the anode side of the fuel cell may cause catalyst degradation on the cathode side of the fuel cell under certain conditions, which ultimately reduces stack performance and durability.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it may be desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

SUMMARY OF EXEMPLARY EMBODIMENTS OF THE INVENTION

One embodiment of the invention includes a fuel cell bipolar plate comprising a substrate comprising a first face, a reactant gas flow field defined in the first face, the reactant gas flow field comprising a plurality of lands and channels, and a plurality of microgrooves formed in the first face.

Other exemplary embodiments of the invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

FIG. 2 illustrates a microgroove that is square or rectangle shaped in cross-section.

FIG. 3 illustrates a microgroove that is semi-circular in cross-section.

FIG. 4 illustrates a microgroove that is v-shaped (triangular shaped) in cross-section.

FIG. 5 illustrates a channel of a fuel cell bipolar plate.

FIG. 15 illustrates a process of making a product comprising selectively depositing a masking material over portions thereof and forming microgrooves in one or more layers overlying the base portion of a fuel cell bipolar plate, according to one embodiment of the invention.

FIG. 16A illustrates a process of making a product comprising forming microgrooves in one or more layers overlying a base portion of a fuel cell bipolar plate and depositing or forming one or more electrically conductive layers over the base portion.

FIG. 16B illustrates a process of making a product comprising forming microgrooves in one or more layers overlying a base portion of a fuel cell bipolar plate and depositing or forming one or more electrically conductive layers over the base portion.

FIG. 16C illustrates a process of making a product comprising forming microgrooves in one or more layers overlying a base portion of a fuel cell bipolar plate and depositing or forming one or more electrically conductive layers over the base portion.

DETAILED DESCRIPTION OF EXEMPLARY EMBODIMENTS

The following description of the embodiments is merely exemplary in nature and is in no way intended to limit the invention, its application, or uses.

Figure 1:
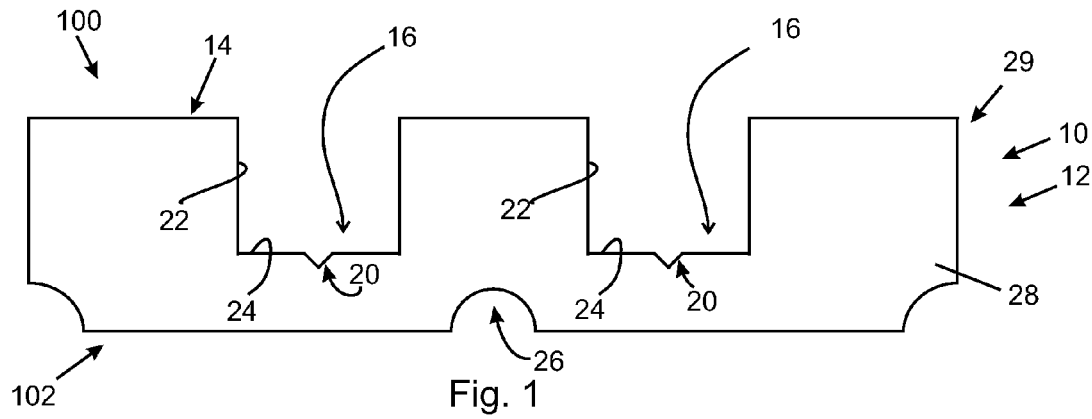
FIG. 1 illustrates a product including a fuel cell bipolar plate comprising microgrooves in the base portion of the fuel cell bipolar plate, according to one embodiment of the invention.

Referring now to FIG. 1, one embodiment of the invention includes a product 10 comprising a fuel cell bipolar plate 12. The fuel cell bipolar plate 12 includes a substrate 29. The substrate 29 may include a base portion 28 and optionally one or more layers over the base portion 28. The base portion 28 may include a variety of materials including, but not limited to, a metal, metal alloy and/or electrically conductive composite. The base portion 28 may include one or more layers.

The fuel cell bipolar plate 12 includes a first face 100 and an opposite second face 102. The fuel cell bipolar plate 12 includes a reactant gas flow field defined at least in part by a plurality of lands 14 and channels 16 in the first face 100. A channel 16 may be defined by side wall(s) 22 and a floor 24. Cooling channels 26 may be formed in the second face 102.

The fuel cell bipolar plate 12 includes microgrooves 20 formed therein. The term "microgroove" as used herein means a groove wherein at least one dimension of the groove has a length which is substantially less than the characteristic channel length, where the channel length is typically less than 100 μm. The microgroove may be formed in a variety of shapes, for example as shown in FIGS. 2-4. A microgroove that is v-shaped (triangular shaped) in cross-section may have a width and/or a depth less than 50 μm; a microgroove that is square or rectangle shaped in cross-section may have a width and/or depth less than 50 μm; or a microgroove that is semicircular in cross-section may have a radius less than 50 μm. In another embodiment (not shown), the microgroove may be trapezoidal or sinusoidal in cross-section. In one embodiment, the microgrooves are randomly oriented.

Referring now to FIG. 5, in one embodiment of the invention the channel 16 may have a width, as indicated by line A, ranging from about 200 μm to about 1 mm, and a depth, as indicated by line B, ranging from about 200 μm to about 1 mm. As shown in FIG. 4, in one embodiment of the invention, the microgroove 20 may have a width, as indicated by line C, ranging from about 1 μm to about 100 μm, and a depth, as indicated by line D, ranging from about 1 μm to about 50 μm. In one embodiment of the invention, the depth (line D) of the microgroove 20 ranges from about 0.1% to 30% of the depth (line B) of the channel 16, and the width (line C) of the microgroove 20 ranges from about 0.1% to 30% of the width (line A) of the channel 16.

The microgrooves 20 may be formed in the base portion 28, or in or through one or more layers over the base portion 28. The microgrooves 20 may be formed, for example, in or over the sidewall(s) of the channels 22 and/or in or over the floor of the channels 24. Preferably the microgrooves are formed only in or over the floor of the channels 24. The microgrooves 20 may be formed by stamping or molding the microgrooves in at least a portion of the base portion 28 using a stamping or molding die containing features to form the microgrooves. The microgrooves 20 may also be formed while machining the channels 16 in the base portion 28. The microgrooves 20 may also be formed by laser micromachining using high-powered pulsed lasers over at least a portion of the first face 100, wherein computer control of the laser head may be used to limit the area of formation of the microgrooves 20 in or over a portion of surfaces defining the channels 16. As illustrated in FIG. 15, the microgrooves 20 may also be formed in the base portion 28 by chemical etching, for example, chromic acid etching. A mask 106 may be selectively deposited over the base portion 28 of the fuel cell bipolar plate 12 leaving an opening 108 exposing a portion of the base portion 28. Thereafter the exposed portion of the base portion 28 may be contacted with an etchant, gas or liquid, to limit the area of formation of the microgrooves 20 to a non-masked portion of the base portion 28. The microgrooves 20 may also be formed by mechanical scribing wherein the microgrooves 20 are scratched into at least a portion of the first face 100 of the fuel cell bipolar plate using, for example, spring-loaded scribing elements such as diamond-tipped steel or carbide-tipped steel.

In another embodiment of the invention, the microgrooves 20 may be formed in one or more layers overlying the base portion 28. In one embodiment, one or more electrically conductive layers 104 may be deposited or formed over the base portion 28 as shown in FIG. 16A. A mask 106 may be selectively deposited over the electrically conductive layer 104 leaving an opening 108 exposing a portion of the electrically conductive layer 104. The exposed portion of the electrically conductive layer 104 may be wet or dry etched to form a microgroove 20 in the electrically conductive layer 104, as shown in FIG. 16B. Optionally, a hydrophilic layer 30 may be deposited or formed over the electrically conductive layer 104, as shown in FIG. 16C. The electrically conductive layer 104 may include, but is not limited to, a metal, a metal alloy, an electrically conductive polymer or polymer with electrically conductive particles or fibers. Examples of a suitable material for the electrically conductive layer 104 include those disclosed in Fronk et al, U.S. Pat. No. 6,372,376, and PVD (physical vapor deposition) gold as disclosed in Vyas et al, U.S. Pat. No. 6,866,958.

Figure 6:
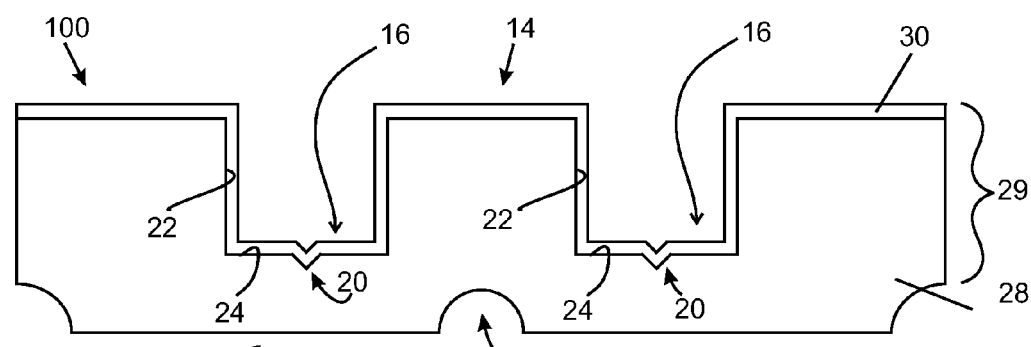
FIG. 6 illustrates a product including a fuel cell bipolar plate comprising microgrooves in a hydrophilic layer overlying the base portion of the fuel cell bipolar plate, according to one embodiment of the invention.

Referring now to FIG. 6, in another embodiment, a hydrophilic layer 30 may be deposited or formed over the first face 100 of the fuel cell bipolar plate 12. The hydrophilic layer 30 may be formed by: depositing a hydrophilic coating over at least a portion of the first face 100 of the fuel cell bipolar plate, for example a metal oxide coating including, but not limited to, silicon dioxide ($SiO_2$), hafnium dioxide ($HfO_2$), zirconium dioxide ($ZrO_2$), aluminum oxide ($Al_2O_3$), stannic oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$), metastable oxynitrides, nonstoichiometric metal oxides, or oxynitrides and mixtures thereof, as disclosed in U.S. Patent Application No. 2006/0216571A1; depositing a hydrophilic coating over at least a portion of the first face 100 of the fuel cell bipolar plate, for example a combination of a conductive material and a metal oxide as disclosed in U.S. Patent Application No. 2006/0194095A1; laser micromachining small features over at least a portion of the first face of the fuel cell bipolar plate; a chemical oxidation treatment over at least a portion of the first face of the fuel cell bipolar plate, for example as disclosed in U.S. Patent Application No. 2006/0040148A1; mechanical scribing over at least a portion of the first face of the fuel cell bipolar plate; chemical etching over at least a portion of the first face of the fuel cell bipolar plate to provide surface roughness or provide surface functional groups; or chemically attaching functional groups to at least a portion of the first face of the fuel cell bipolar plate. In one embodiment, the hydrophilic layer 30 is formed by chemical etching of a fuel cell bipolar plate comprising stainless steel using 20% nitric acid and 10% hydrofluoric acid. A hydrophilic layer 30 may also be formed by incorporating fine structures into the carbon-composite molding die or into the metallic stamping die.

A fuel cell bipolar plate with hydrophilic properties causes water in the channels to spread along the surface in a process termed spontaneous wetting or imbibition. The resulting thin film has less of a tendency to alter the flow distribution along the array of channels connected to the common inlet and outlet headers. If the plate material has sufficiently high surface energy, water transported through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle formed between a liquid surface and solid surface and α is the channel corner angle. For a rectangular channel α/2=45°, which dictates that spontaneous wetting will occur when the static contact angle is less than 45°. For the roughly rectangular channels used in current fuel cell stack designs with composite fuel cell bipolar plates, this sets an approximate upper limit on the contact angle needed to realize the beneficial effects of hydrophilic plate surfaces on channel water transport and low load stability.

Figure 7:
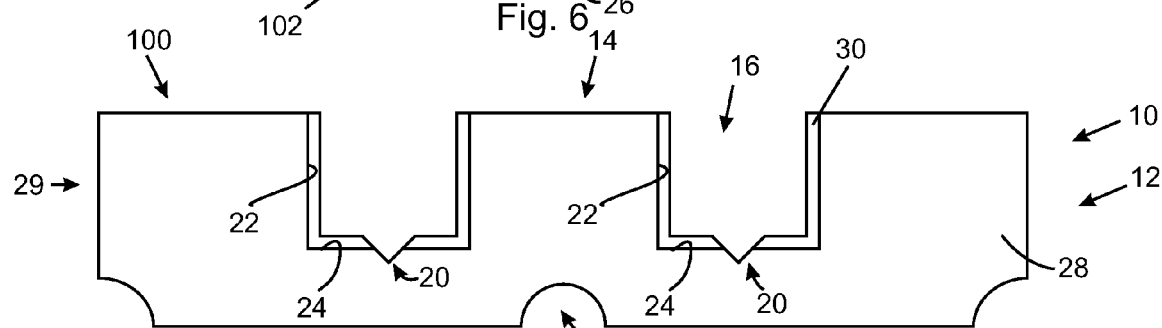
FIG. 7 illustrates a product including a fuel cell bipolar plate comprising a hydrophilic layer overlying at least a portion of the base portion of the fuel cell bipolar plate and microgrooves overlying the base portion of the fuel cell bipolar plate, according to one embodiment of the invention.

Referring now to FIG. 7, the hydrophilic layer 30 may be formed over the sidewalls 22 of the channels 16 and over the portion of the floors 24 of the channels 16 on either side of the microgrooves 20 but not including the microgrooves. This may be done, for example, by selectively depositing a mask over the lands and/or channels of the fuel cell bipolar plate before forming the hydrophilic layer 30 and subsequently removing the mask.

Figures 8A, 8B, 8C:
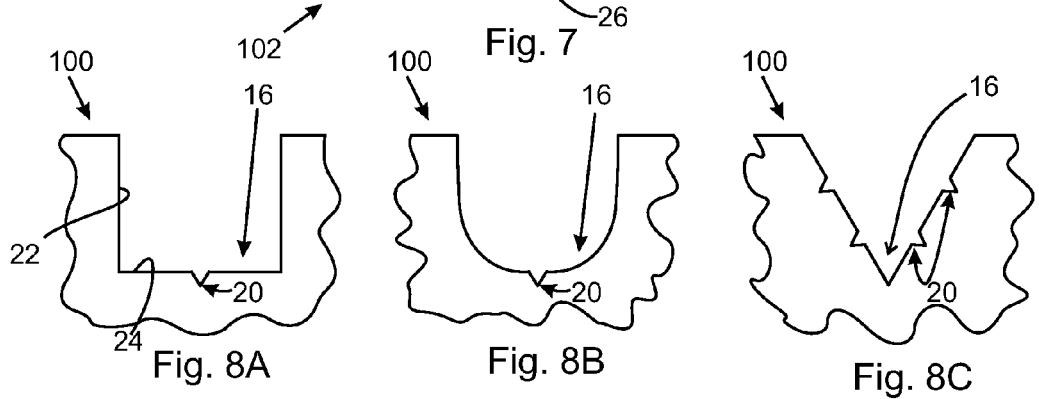
FIG. 8A illustrates a product including channels rectangular in cross-section of a fuel cell bipolar plate having microgrooves therein, according to one embodiment of the invention.
FIG. 8B illustrates a product including channels u-shaped in cross-section of a fuel cell bipolar plate having microgrooves therein, according to one embodiment of the invention.
FIG. 8C illustrates a product including channels v-shaped in cross-section of a fuel cell bipolar plate having microgrooves therein, according to one embodiment of the invention.

In another embodiment of the invention, the channels 16 may be any shape. As illustrated in FIG. 8A the channels 16 may be rectangular in cross-section, or as illustrated in FIG. 8B the channels may be u-shaped in cross-section, or as illustrated in FIG. 8C the channels may be v-shaped in cross-section. In another embodiment (not shown), the channels 16 may be trapezoidal or sinusoidal in cross-section. Similarly, the microgrooves 20 may have any suitable shape. For example, the microgrooves 20 may be rectangular in cross-section, u-shaped in cross-section, or v-shaped in cross-section similar to the channels 16 shown in FIGS. 8A, 8B and 8C. In another embodiment (not shown), the microgrooves 20 may be trapezoidal or sinusoidal in cross-section.

Figure 9:
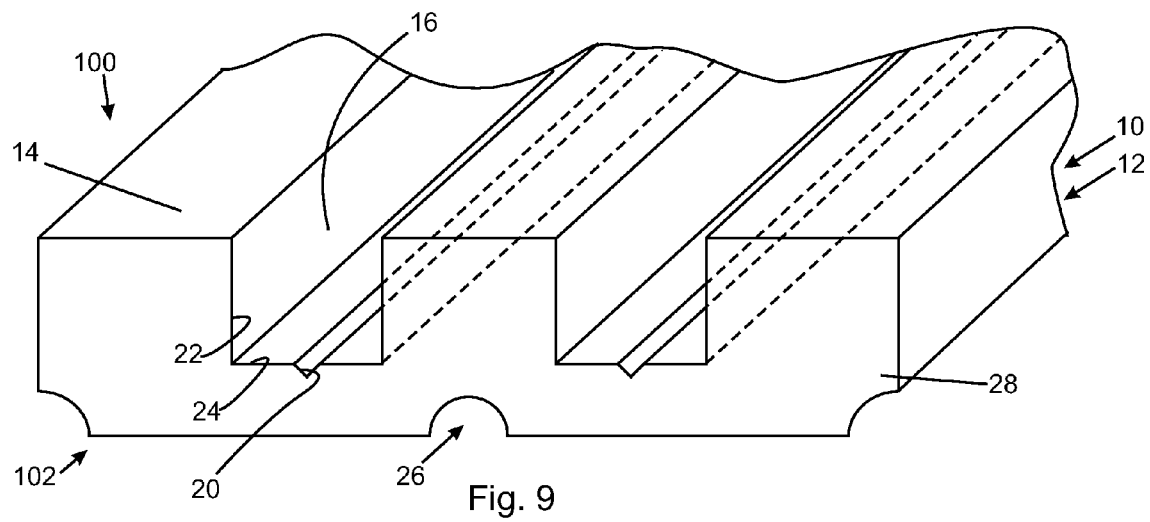
FIG. 9 illustrates a product including a fuel cell bipolar plate comprising microgrooves in the base portion of the fuel cell bipolar plate, according to one embodiment of the invention.

Referring now to FIG. 9, in one embodiment of the invention, the microgrooves 20 may be oriented substantially parallel to the longitudinal axis of a segment of a channel 16 of the fuel cell bipolar plate 12.

Figure 10:
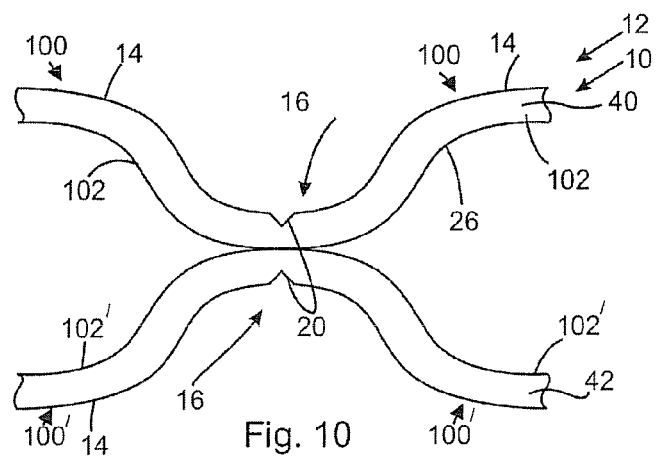
FIG. 10 illustrates a product including a fuel cell bipolar plate comprising microgrooves, according to one embodiment of the invention.

Referring now to FIG. 10, another embodiment of the invention comprises a fuel cell bipolar plate 12 comprising a first thin metal sheet 40 and a second thin metal sheet 42 which each have been stamped and joined to provide a plurality of lands 14 and channels 16. Microgrooves 20 may be formed in the first faces 100 and 100' of the first metal sheet 40 and the second metal sheet 42, respectively. Cooling channels 26 may be provided in the second faces 102 and 102' of the first metal sheet 40 and the second metal sheet 42, respectively.

Figure 11:
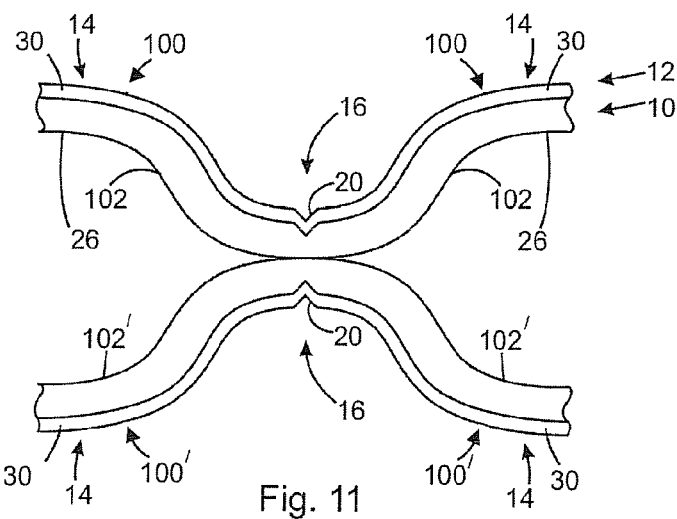
FIG. 11 illustrates a product including a fuel cell bipolar plate comprising a hydrophilic layer overlying at least a portion of the base portion of the fuel cell bipolar plate and microgrooves in one or more layers overlying the base portion of the fuel cell bipolar plate, according to one embodiment of the invention.

Referring now to FIG. 11, in another embodiment of the invention, the hydrophilic properties of the first faces 100 and 100' of the fuel cell bipolar plate may be enhanced by forming a hydrophilic layer 30 over the first faces of the fuel cell bipolar plate, as described above.

Figure 12:
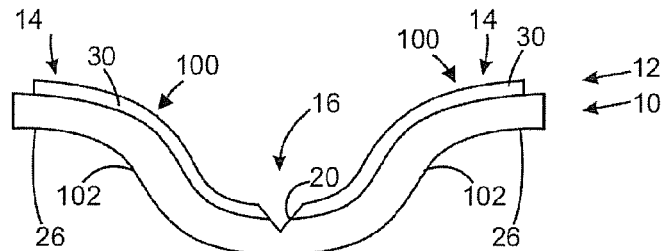
FIG. 12 illustrates a product including a fuel cell bipolar plate comprising a hydrophilic layer overlying at least a portion of the base portion of the fuel cell bipolar plate and microgrooves in one or more layers overlying the base portion of the fuel cell bipolar plate, according to one embodiment of the invention.

Referring now to FIG. 12, in another embodiment of the invention, the hydrophilic layers 30 may be selectively formed over the first faces 100 and 100' of the fuel cell bipolar plate but not including the microgrooves 20. This may be done, for example, by selectively depositing a mask over the lands 14 and/or channels 16 of the fuel cell bipolar plate before forming the hydrophilic layers 30 and subsequently removing the mask.

Figure 13:
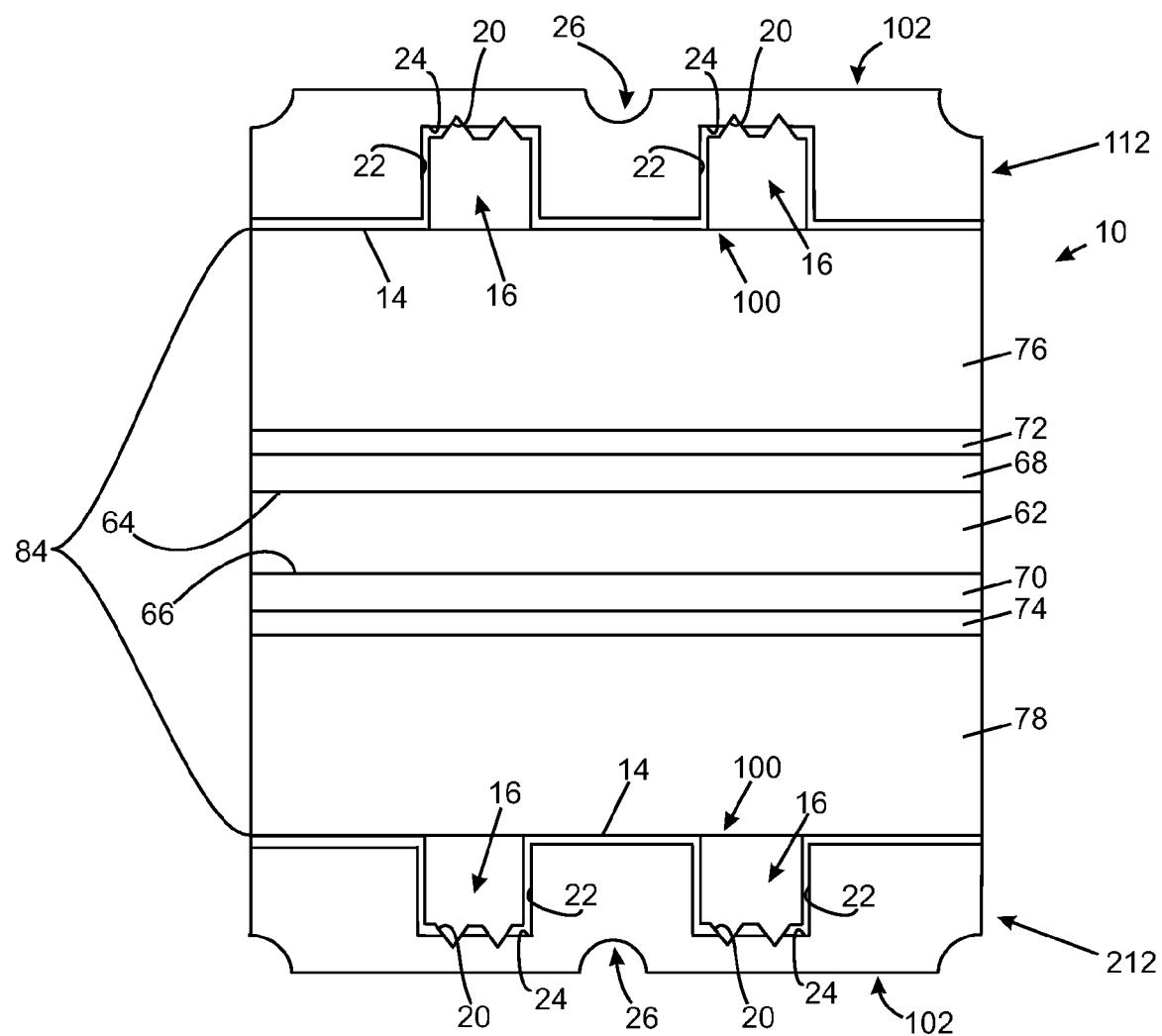
FIG. 13 illustrates a product comprising a plurality of fuel cell bipolar plates and a soft goods portion, according to one embodiment of the invention.

In another embodiment of the invention illustrated in FIG. 13, a product 10 comprises a first fuel cell bipolar plate 112 having a first face 100 having a reactant gas flow field defined therein by a plurality of lands 14 and channels 16, a second fuel cell bipolar plate 212 having a first face 100 having a reactant gas flow field defined therein by a plurality of lands 14 and channels 16, and a soft goods portion 84 provided therebetween. The soft goods portion 84 may include a polymer electrolyte membrane 62 comprising a first face 64 and a second face 66. A cathode 68 may overlie the first face 64 of the polymer electrolyte membrane 62. A first gas diffusion media layer 76 may overlie the cathode 68, and optionally a first microporous layer 72 may be interposed between the first gas diffusion media layer 76 and the cathode 68. The first fuel cell bipolar plate 112 overlies the first gas diffusion media layer 76. An anode 70 may underlie the second face 66 of the polymer electrolyte membrane 62. A second gas diffusion media layer 78 may underlie the anode layer 70, and optionally a second microporous layer 74 may be interposed between the second gas diffusion media layer 78 and the anode 70. The second fuel cell bipolar plate 212 may overlie the second gas diffusion media layer 78.

Figure 14A:
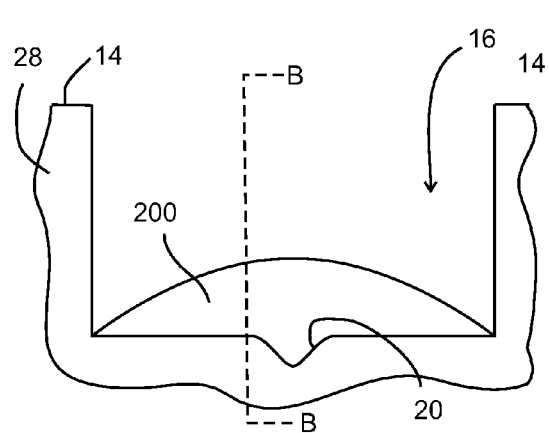
FIG. 14A illustrates a water droplet in a fuel cell bipolar plate channel with a microgroove.
Figure 14B:
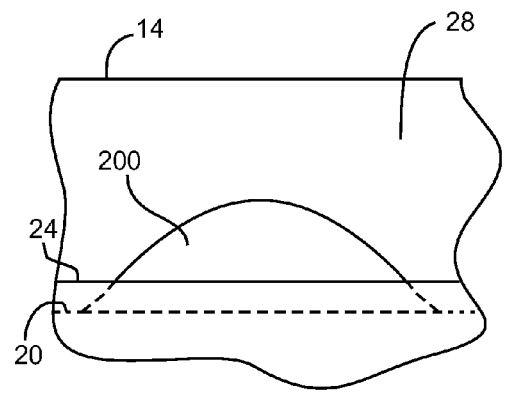
FIG. 14B is a sectional view taken along line B-B of FIG. 14A illustrating a water droplet in a fuel cell bipolar plate channel with a microgroove.

FIG. 14A illustrates a water droplet 200 in a channel 16 with a microgroove 20. FIG. 14B is a sectional view taken along line B-B illustrating microgroove spontaneous wetting (imbibition) for a channel 16 with a width-to-depth aspect ratio of 0.6, and a rounded triangle microgroove 20 with depth about ⅐ that of the channel 16, and a channel contact angle of 45°.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The above description of embodiments of the invention is merely exemplary in nature and, thus, variations thereof are not to be regarded as a departure from the spirit and scope of the invention.

What is claimed is:

1. A product comprising:
   a fuel cell bipolar plate comprising a substrate comprising a base portion, a first face, and an opposite second face;
   a reactant gas flow field defined in the first face, the reactant gas flow field comprising a plurality of lands and channels formed in the base portion;
   a coolant fluid flow field defined in the second face, the coolant fluid flow field comprising a plurality of cooling channels formed in the base portion; and
   a plurality of microgrooves formed in the first face, with the proviso that the microgrooves do not extend through the base portion wherein the substrate comprises at least a first electrically conductive layer over the base portion and wherein the plurality of microgrooves are formed in or through the first electrically conductive layer.

2. A product as set forth in claim 1 wherein the plurality of microgrooves extends into the base portion.

3. A product as set forth in claim 1 further compromising a hydrophilic layer over at least a portion of the first electrically conductive layer.

4. A product as set forth in claim 3 wherein no hydrophilic layer overlies the microgrooves.

5. A product as set forth in claim 3 wherein the hydrophilic layer overlies the microgrooves.

6. A product as set forth in claim 3 wherein the microgrooves extend through the first electrically conductive layer.

7. A product as set forth in claim 3 wherein the microgrooves extend through the first electrically conductive layer and into the base portion.

8. A product as set forth in claim 3 wherein no hydrophilic layer and no electrically conductive layer overlies the microgrooves.

9. A product as set forth in claim 1 wherein at least one of the microgrooves communicates with one of the channels.

10. A product as set forth in claim 1 wherein each channel is defined by a floor and at least one wall and wherein the microgrooves are formed at least in the floor.

11. A product as set forth in claim 1 wherein the microgrooves are randomly oriented with respect to each other.

12. A product as set forth in claim 1 wherein at least one of the microgrooves is formed in a direction substantially parallel to a longitudinal axis of one of the channels.

13. A product as set forth in claim 1 wherein the cross-sectional configuration of the microgrooves is v-shaped.

14. A product as set forth in claim 1 wherein the cross-sectional configuration of the microgrooves is rectangular.

15. A product as set forth in claim 1 wherein the cross-sectional configuration of the microgrooves is semi-circular.

16. A product as set forth in claim 1 wherein the cross-sectional configuration of the microgrooves is trapezoidal.

17. A product as set forth in claim 1 wherein the cross-sectional configuration of the microgrooves is sinusoidal.

18. A product as set forth in claim 1 wherein the depths of the microgrooves are 0.1% to 30% of the depths of the channels.

19. A product as set forth in claim 1 wherein the widths of the microgrooves are 0.1% to 30% of the widths of the channels.

20. A product as set forth in claim 1 wherein the cross-sectional configuration of the channels is u-shaped.

21. A product as set forth in claim 1 wherein the cross-sectional configuration of the channels is rectangular.

22. A product as set forth in claim 1 wherein the cross-sectional configuration of the channels is v-shaped.

23. A product as set forth in claim 1 wherein the cross-sectional configuration of the channels is trapezoidal.

24. A product as set forth in claim 1 wherein the cross-sectional configuration of the channels is sinusoidal.

25. A product as set forth in claim 1 wherein the product further comprises:
   a plurality of fuel cell bipolar plates; and
   a soft goods portion positioned between adjacent fuel cell bipolar plates and facing the reactant gas flow fields, wherein the soft goods portions comprises an anode and a cathode on opposite faces of a polymer electrolyte membrane.

26. A product as set forth in claim 1 wherein the base portion comprises a metal or a metal alloy.

27. A product as set forth in claim 1 wherein the base portion comprises a carbon-composite material.

28. A product as set forth in claim 1 wherein the microgrooves have widths or depths ranging from about 1 μm to about 50 μm.

29. A process comprising: providing a fuel cell bipolar plate comprising a substrate comprising a base portion, a first face comprising a plurality of lands and channels formed in the base portion, and an opposite second face comprising a plurality of cooling channels formed in the base portion; at least one of a first electrically conductive layer or a hydrophilic layer over the substrate and
   forming microgrooves in or through at least one of the substrate, electrically conductive layer or hydrophilic layer with the proviso that the microgrooves do not extend through the base portion.

30. A process as set forth in claim 29 wherein the microgrooves are formed in or through the first electrically conductive layer.

31. A process as set forth in claim 29 wherein the microgrooves are formed in or through the hydrophilic layer.

32. A process as set forth in claim 29 wherein the forming microgrooves comprises at least one of stamping, molding, machining, laser micromachining, chemical etching, or mechanical scribing.

33. A process as set forth in claim 29 wherein the microgrooves have a cross-sectional shape that is at least one of triangular, square, rectangular, semi-circular, trapezoidal, or sinusoidal.

34. A process as set forth in claim 29 wherein the microgrooves are formed in at least one surface defining the channel.

35. A process as set forth in claim 29 wherein the channels are each defined by at least one wall and a floor and wherein the microgrooves are formed in the floor.

36. A process as set forth in claim 29 wherein the channels are each defined by at least one wall and wherein the microgrooves are formed in the wall.

37. A process as set forth in claim 29 wherein the channels have a cross-sectional shape that is at least one of rectangular, u-shaped, v-shaped, trapezoidal, or sinusoidal.

38. A process as set forth in claim 29 wherein providing the fuel cell bipolar plate comprises a stamping process.

39. A process as set forth in claim 38 wherein the microgrooves are formed by a secondary process that does not include stamping.

40. A process as set forth in claim 29 wherein the base portion consists essentially of a metal or a metal alloy, or comprises a carbon-composite material.

41. A product comprising:
 a fuel cell bipolar plate comprising a substrate comprising a base portion, a first face, and an opposite second face;
 a reactant gas flow field defined in the first face, the reactant gas flow field comprising a plurality of lands and channels formed in the base portion;
 a coolant fluid flow field defined in the second face, the coolant fluid flow field comprising a plurality of cooling channels formed in the base portion; and
 a plurality of microgrooves formed in the first face, with the proviso that the microgrooves do not extend through the base portion wherein the substrate comprises at least a first electrically conductive layer over at least a portion of the base portion, and a hydrophilic layer over at least a portion of the first electrically conductive layer.

42. A product as set forth in claim 41 wherein no hydrophilic layer overlies the microgrooves.

43. A product as set forth in claim 41 wherein the hydrophilic layer overlies the microgrooves.

44. A product as set forth in claim 41 wherein the microgrooves extend through the hydrophilic layer.

45. A product as set forth in claim 41 wherein the microgrooves extend through the hydrophilic layer and into the base portion.

* * * * *